(12) United States Patent
Shahriar et al.

(10) Patent No.: US 11,904,338 B2
(45) Date of Patent: Feb. 20, 2024

(54) FLUID DISPENSING AND CURING SYSTEM

(71) Applicants: Khaled Mohammad Shahriar, New Hyde Park, NY (US); Domenico Assalone, Eastchester, NY (US)

(72) Inventors: Khaled Mohammad Shahriar, New Hyde Park, NY (US); Domenico Assalone, Eastchester, NY (US)

( * ) Notice: Subject to any disclaimer, the term of this patent is extended or adjusted under 35 U.S.C. 154(b) by 355 days.

(21) Appl. No.: 17/129,718

(22) Filed: Dec. 21, 2020

(65) Prior Publication Data

US 2021/0187533 A1  Jun. 24, 2021

Related U.S. Application Data

(60) Provisional application No. 62/952,254, filed on Dec. 21, 2019.

(51) Int. Cl.
| | |
|---|---|
| *B05B 13/04* | (2006.01) |
| *B05B 12/12* | (2006.01) |
| *B05D 3/06* | (2006.01) |
| *B05D 3/02* | (2006.01) |

(52) U.S. Cl.
CPC .......... *B05B 13/0431* (2013.01); *B05B 12/12* (2013.01); *B05D 3/0254* (2013.01); *B05D 3/067* (2013.01)

(58) Field of Classification Search
None
See application file for complete search history.

(56) References Cited

U.S. PATENT DOCUMENTS

| | | | | |
|---|---|---|---|---|
| 4,850,382 A | * | 7/1989 | Williams | B05B 13/0431 52/64 |
| 5,092,307 A | * | 3/1992 | Behr | B05B 13/0452 118/323 |
| 6,372,053 B1 | * | 4/2002 | Belanger | B60S 3/04 134/123 |
| 9,579,679 B2 | | 2/2017 | Mathis | |
| 2003/0127046 A1 | * | 7/2003 | Zehner | B08B 3/04 118/302 |
| 2004/0238016 A1 | * | 12/2004 | Krause | B60S 3/04 134/123 |
| 2005/0066890 A1 | * | 3/2005 | Wetzel | B05B 13/0452 118/313 |
| 2005/0088647 A1 | * | 4/2005 | Shanmugasundram | C23C 18/1651 356/326 |
| 2016/0008835 A1 | * | 1/2016 | Giusti | B05C 5/027 118/313 |

(Continued)

*Primary Examiner* — Charles Capozzi
(74) *Attorney, Agent, or Firm* — Barclay Damon LLP (57) ABSTRACT

A robotic system for applying a volatile fluid to a work-piece comprising a support structure configured to mount at least one spray nozzle while facilitating motion of the nozzle in multiple degrees of freedom. An encoder senses a position of the spray nozzle and issues a position signal indicative thereof. A pneumatically-driven motor effects displacement of the spray nozzle on the support structure along each degree of freedom. A controller disposed outside the boundaries defined by the structural support, is responsive to the position signals for controlling the pneumatically-driven motor to displace the spray nozzle while dispensing the volatile fluid. The pneumatically driven motor and the isolated spatial position of the controller prohibits a source of ignition for the volatile fluid sprayed by the nozzle.

25 Claims, 8 Drawing Sheets

(56) References Cited

U.S. PATENT DOCUMENTS

2016/0136684 A1* 5/2016 Lindgren ............ F26B 3/30
                                              250/492.1
2017/0203318 A1* 7/2017 Vähänen ............ B05B 15/70
2019/0337167 A1   11/2019 Clifford et al.

* cited by examiner

FLUID DISPENSING AND CURING SYSTEM

CROSS-REFERENCE TO RELATED APPLICATIONS

This application relates to commonly-owned, U.S. Provisional Patent Application, Ser. No. 62/952,254 entitled "PNEUMATIC ROBOTIC FLUID SPRAYING SYSTEM" filed on Dec. 21, 2019. The contents of such application are included herein in their entirety.

PRIORITY CLAIM

This application claims the benefit of, and priority to, commonly-owned, U.S. Provisional Patent Application, Ser. No. 62/952,254 entitled "PNEUMATIC ROBOTIC FLUID SPRAYING SYSTEM" filed on Dec. 21, 2019. The contents of such application are included herein in their entirety.

COPYRIGHT NOTICE

Portions of this document may contain material which is subject to copyright protection. The copyright owner has no objection to the facsimile reproduction of the patent disclosure, as it appears in the Patent and Trademark Office patent files or records, but otherwise reserves all rights relating to the reproduction, distribution, copying and display of this copyrighted work.

TECHNICAL FIELD

The present invention relates to a fluid deposition and curing system for spraying/curing fluid on a work-piece, and more particularly, a new, useful and cost effective fluid spraying and curing system for depositing a volatile fluid on a work-piece to mitigate hazards due to the flammability of such volatile fluids.

BACKGROUND

Spray systems used in the automobile, boating or aircraft industries typically employ a spray booth having one or more articulating heads which traverse the surface of the work-piece, e.g., fender, bumper, hull, bulkhead, or tailcone etc., as paint is deposited on the surface. Generally, the spray environment is highly controlled and properly ventilated to prevent volatiles gassing off the spayed paint from reaching a combustible level. Inasmuch as an Original Equipment Manufacturer (OEM) can readily control the work environment, i.e., the volatiles therein, robotic systems employing electronically-controlled motors can be implemented in a manner which essentially eliminates the potential for producing a flammable work environment. On the other hand, business operators which repair or repaint vehicles, or discrete parts thereof, generally do not have the necessary controls to obviate the creation of a flammable or hazardous work environment. As such, these operators generally employ hand held spray deposition systems, the efficacy thereof being highly dependent upon operator skill and touch to deposit the fluid, i.e., paint, acrylic, resin, or clear coat, evenly and with the proper thickness. That is, robotic systems have not been employed in business operations which do not have repeatable requirements, i.e., always having different work-pieces with different surface contour, and do not have the ability to monitor the environment to the level necessary to avoid a hazardous condition.

The foregoing describes some, but not necessarily all, of the problems, disadvantages and shortcomings related to prior art spray deposition systems. A need, therefore, exists for a fluid deposition system which provides a highly controlled, evenly deposited, fluid coating or spray on a surface of a work-piece without incurring environmental hazards due to the flammability of a volatile fluid. An need also exists for providing such robotic system so as to minimize the time and cost associated with curing and/or drying the sprayed fluid.

SUMMARY

In one embodiment of the disclosure, a robotic system for applying and curing a volatile fluid to a work-piece is provided, comprising a support structure configured to mount at least one spray nozzle while facilitating motion of the nozzle in multiple degrees of freedom. An encoder senses a position of the spray nozzle issues a position signal indicative thereof. A pneumatically-driven motor effects displacement of the spray nozzle on the support structure along each degree of freedom. A controller disposed outside the boundaries defined by the structural support, is responsive to the position signals for controlling the pneumatically-driven motor to displace the spray nozzle while dispensing the volatile fluid. The pneumatically driven motor and confined or isolated spatial position of the controller prohibits a source of ignition for the volatile fluid sprayed by the nozzle.

In another embodiment, the robotic system may be equipped with machine vision to completely scan and plot the required data points to apply and cure the fluid. In yet another embodiment, the robotic system may employ more economical full-spectrum sensors to identify the color spectrum as to where and when to apply and cure the sprayed fluid.

In yet other embodiments, its common practice to utilize displacement sensors to maintain a requisite distance from the work-piece to the spray nozzle and/or the curing unit. All of the foregoing may be performed at the set-up or mapping stage, where the system utilizes a combination of techniques and methods to teach the pathways prior to performing a spray operation. As such, the risks and hazards associated with running electronics together with active spray nozzles are mitigated.

Additional features and advantages of the present disclosure are discussed in, and will be apparent from, the following Brief Description of the Drawings and Detailed Description.

DETAILED DESCRIPTION

This disclosure is directed to a robotic fluid dispensing system for spraying a volatile fluid, such as a resin based paint or coating on the surface of a work-piece. While the disclosure illustrates a robotic fluid dispensing system for an automobile, it will be appreciated that the fluid dispensing system is applicable to discrete components of the automobile or to other vehicles such as boats, fixed wing aircraft, rotary wing aircraft, and parts thereof. Additionally, it should also be appreciated that the robotic fluid dispensing system may be applicable to any work-piece, e.g., panels, doors, sheathing, etc., wherein an investment in robotic automation is warranted and, of course, profitable.

Figure 1:
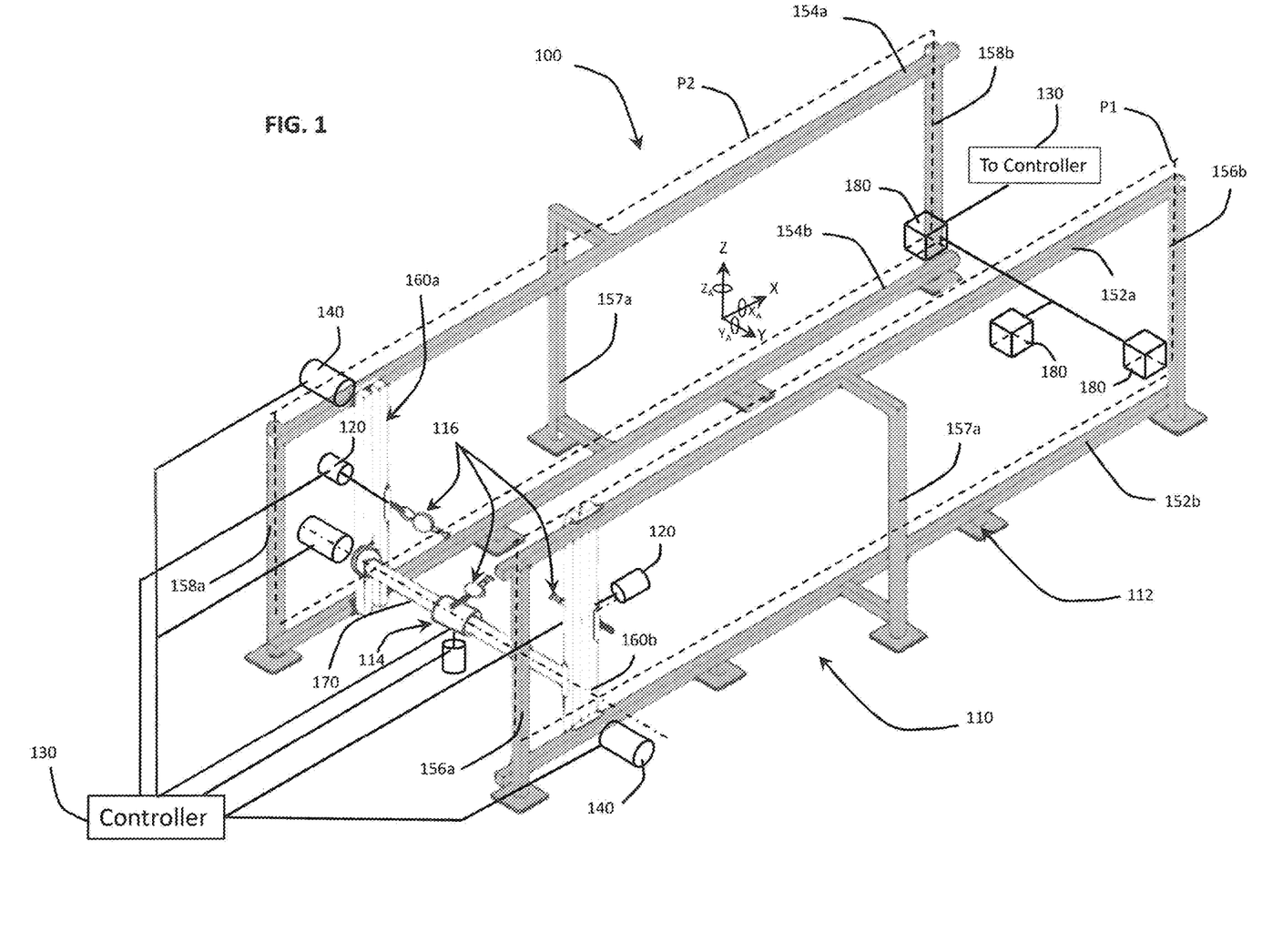
FIG. 1 is a perspective view of a first embodiment of a robotic fluid dispensing and curing system including a cuboid-shaped structural support having stationary support frame and a movable carriage assembly for mounting for three spray nozzles for dispensing a fluid onto a work-piece.

In FIG. 1, an exemplary embodiment of a robotic fluid dispensing system 100 includes a cuboid-shaped support structure 110 comprising a stationary support structure 112 and a movable carriage assembly 114. The support structure 110 is configured to mount at least one nozzle 116 for spraying a fluid on a surface of the work-piece (not shown), which support structure 110 facilitates displacement of the spray nozzle in multiple degrees of freedom. In the embodiment depicted in FIG. 1, a plurality of spray nozzles 116 are mounted to the movable carriage 114, though it should be appreciated that a single spray nozzle may be employed depending upon the degrees of freedom provided by the movable carriage 114. This will understood when describing other embodiments, such as that disclosed in FIG. 5 of the present application.

At least one position sensor 120, operatively coupled to a controller 130, is configured to sense a position of each spray nozzle 116 and provides position signals indicative thereof to the controller 130. Additionally, at least one pneumatically driven drive device 140 effects displacement of the respective spray nozzle 116 along each degree of freedom provided by the support structure 110. The controller 130 is responsive to the position signals and is additionally operatively coupled to the pneumatic drive device 140 and spray nozzle 116, to control the displacement, and flow of fluid being dispensed from the spray nozzle 116. That is, in the described embodiment, an encoder provides the location of the at least one spray nozzle 116 while a pneumatically driven motor 140 receives control signals issued by the controller 130 to control the position and rate of displacement of the spray nozzle 116. A closed loop error feedback system may be employed to provide precise and immediate error position control of the movable carriage 114, the spray nozzles 116 and pneumatically-driven drive devices 140. At the same time, a predefined algorithm controls the fluid flow rate and/or volume of fluid flow dispensed by the spray nozzle 116 onto the surface of work-piece. One skilled in the art of control laws will readily develop the requisite control law algorithms and source code to efficiently and effectively program the controller 130 to control the amount of fluid dispensed from the spray nozzles, the relative position each spray nozzle 116 from the work-piece, the relative position of one spray nozzle 116 relative to another spray nozzle 116 and the rate of displacement of each spray nozzle 116 over the surface of the work-piece. The preferred control algorithms and method for controlling fluid dispensation will be discussed in greater detail hereinafter when describing the embodiments of FIGS. 2 through 4.

In the described embodiment, the stationary support structure 110 of the cuboid-shaped support structure defines at least two (2) pairs of parallel horizontal tracks 152a, 152b, 154a, 154b which are separated and supported by at least four (4) vertical support members 156a, 156b, 158a, 158b, disposed at each corner of the cuboid-shaped support structure 110. Consequently, two (2) corner vertical support members and their respective pair of horizontal tracks 156a, 156b, 152a, 152b define a right side plane P1 while another of the two (2) corner vertical support members and their respective pair of horizontal tracks 158a, 158b, 154a, 154b define a left side plane P2. For added structural stability, intermediate vertical support members 153a, 153b may be disposed between each pair of corner vertical support members 152a, 152b, 154a, 154b and mounted outboard of each of the right and left side planes P1, P2.

The movable carriage assembly 120 of the cuboid-shaped support structure includes at least one pair of vertical track members 160a, 160b and a horizontal cross-member 170, wherein each of the vertical track members 160a, 160b are configured for displacement mounting to each pair of horizontal tracks 158a, 158b, 154a, 154b, and wherein the horizontal cross-member 170 is configured for displacement mounting to each of the track members 160a, 160b. Each displacement mount includes a pneumatically motor driven device operatively coupled to the controller 140 to affect displacement of: (i) each vertical track member 160a, 160b relative to each pair of stationary horizontal tracks 158a, 158b, 154a, 154b, and, (ii) the cross-member 170 relative to each vertical track number 160a, 160b.

In a first embodiment of the disclosure, a spray nozzle 116 is articulately mounted to each member of the movable carriage assembly 120 such that each spray nozzle 116 may be displaced along three dimensional planes (X, Y, Z) and along at least one axis of rotation XA. While the support structure 110 and movable carriage provides displacement along three dimensional planes and one rotational axis, it will be appreciated that additional degrees of freedom, i.e., rotational displacement along two or more axes XA, YA, ZA, are desirable and may be obtained by articulately mounting the spray nozzles 116 onto each member of the movable carriage 114. For example, a first and second spray nozzle 116 may be mounted to the vertical rails 160a, 160b while a third spray nozzle 116 may be mounted to cross-member 170. In the described embodiment, the third spray nozzle 116 may rotate about a pitch axis XA disposed along the cross member 170.

Figure 2:
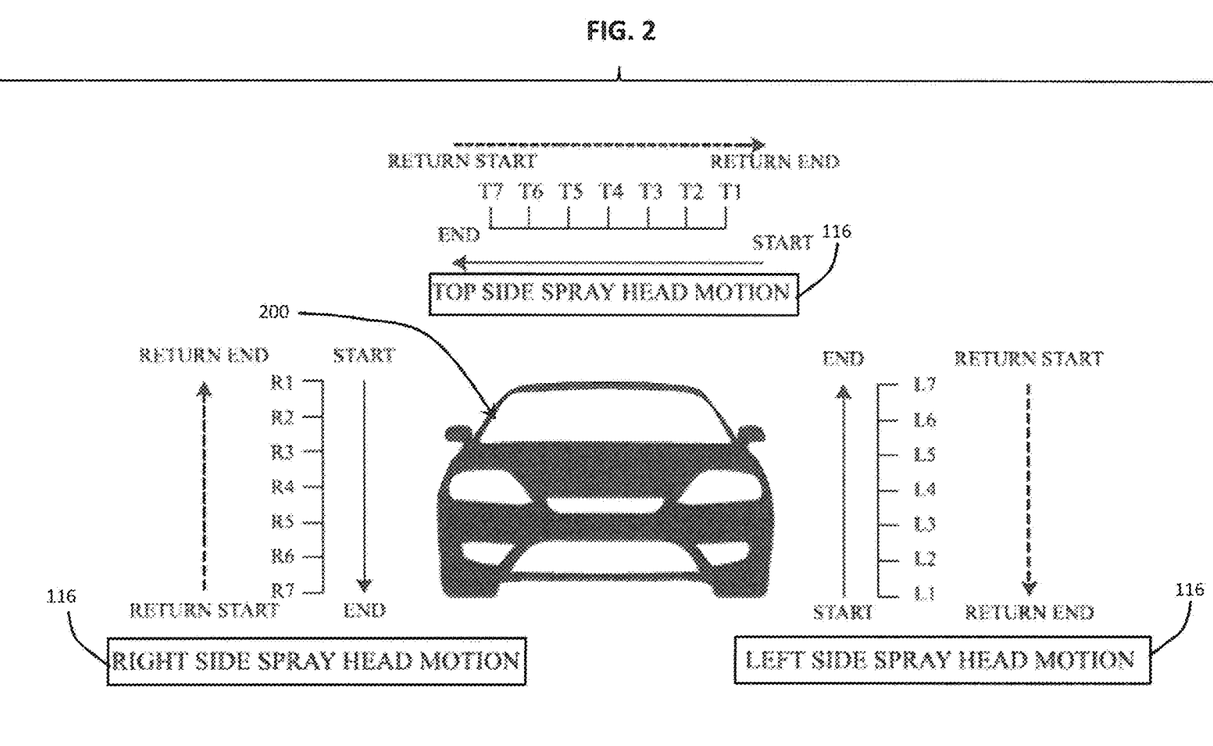
FIG. 2 is a schematic illustration of a sequenced displacement of the three spray nozzles of the fluid deposition system.
Figure 3:
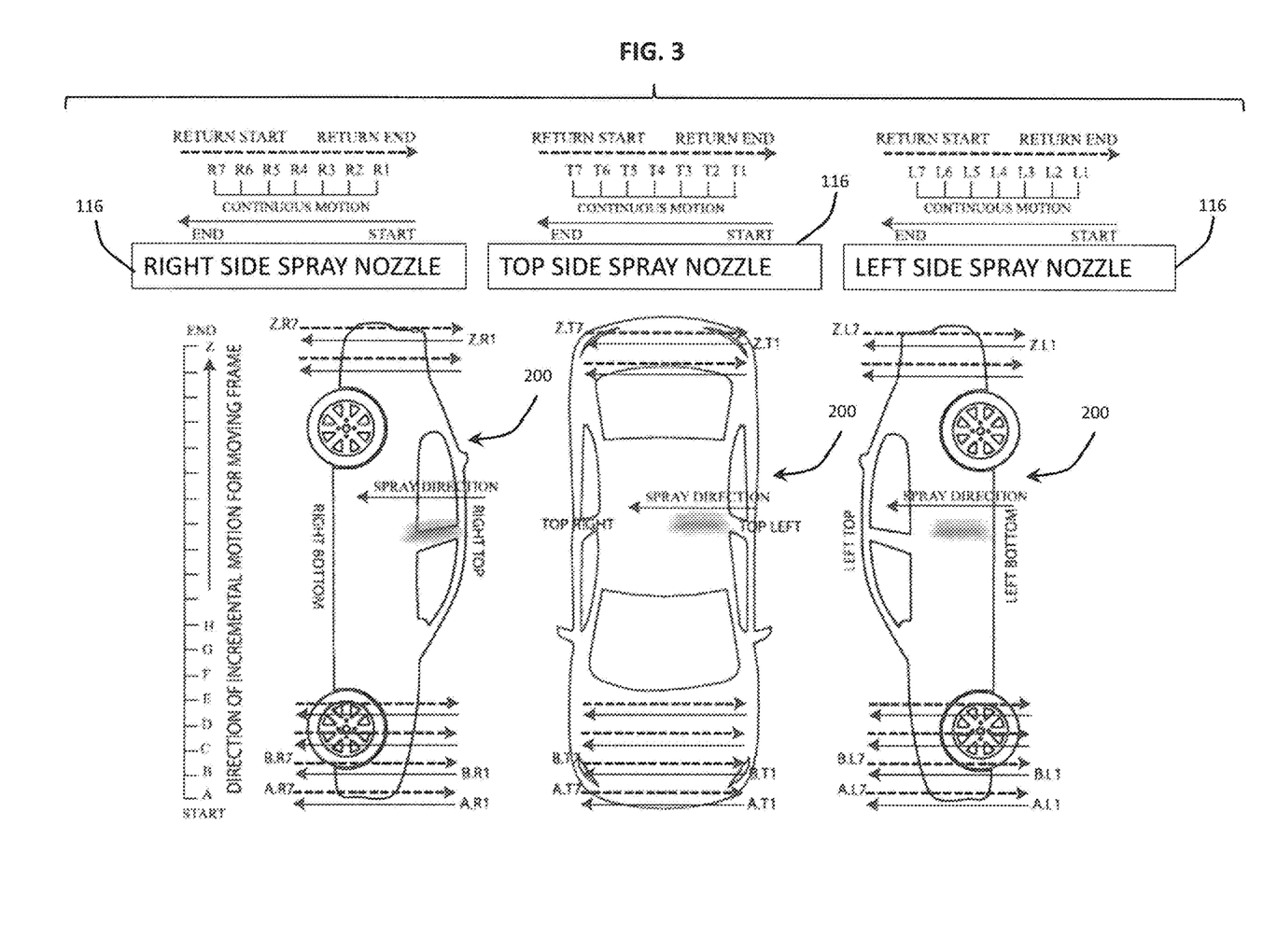
FIG. 3 is a schematic illustration of a first sequenced displacement pattern of the three spray nozzles of the fluid deposition system which depict the spray head movement necessary to avoid conflict of multiple heads spraying a particular area at a specific time.
Figure 4:
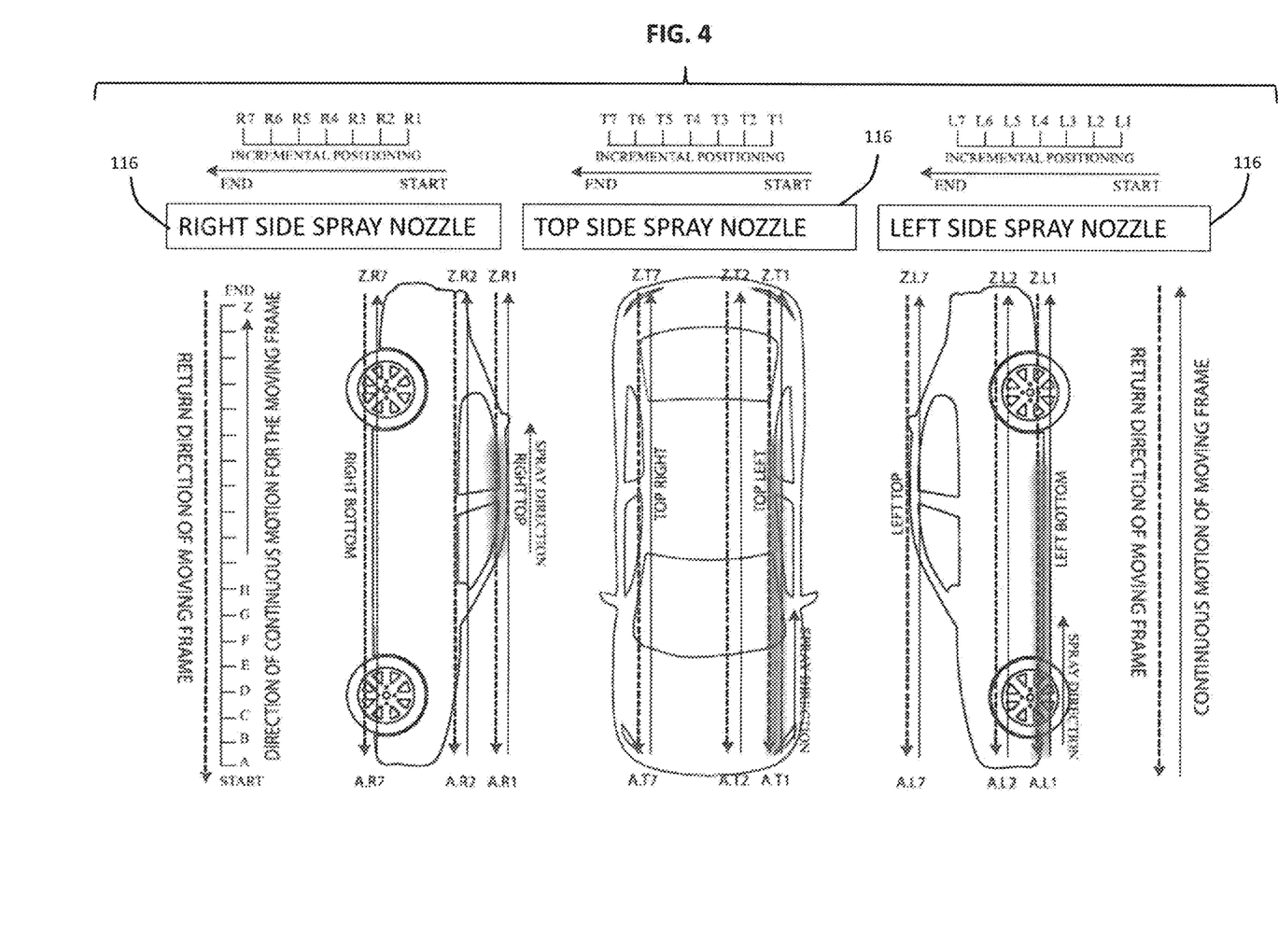
FIG. 4 is a schematic illustration of a second sequenced displacement pattern of the three spray nozzles of the fluid deposition system which depict the spray head movement necessary to avoid conflict of multiple heads spraying a particular area at a specific time.

In FIGS. 2 through 4, two spray patterns are disclosed which describe methods for providing full coverage, uniform thickness, spray coating of a surface. For complete coverage, the starting position of the left-side spray nozzle 116 is along the left side bottom surface of a vehicle 200. The starting position of the right-side spray nozzle 116 is along the right-side upper surface of the vehicle 200 while the starting position of the top-side spray nozzle 116 is at the left-side top surface 200. The starting position of the movable carriage assembly 114 is at the left side front of the support structure 110, i.e., along the left-side front of the perspective shown in FIG. 1.

In FIG. 3, the first pattern is characterized by the carriage assembly 114 moving incrementally, e.g., seven (7) increments, from a start position R1, L1, T1 to an end position R7, L7, T7, and continuing along a reverse path from the end position to the start position. At each incremental position of the carriage assembly 114, the left and right spray nozzles 116 move vertically in a continuous motion while the top spray nozzle 116 moves continuously from start-to-end, and end-to-start positions before the movable carriage assembly 114 shifts to its next incremental position.

The second pattern is characterized by the left, right and top-side spray nozzles 116 moving incrementally from a start-to-end position after moving carriage assembly 114 completes a full cycle of movement. At each incremental position of three spray nozzles 116, the moving carriage assembly 114 travels continuously front-to-back and back-to-front before the spray nozzles 116 shift from their respective incremental position.

An examination of each of the two patterns reveals that the spray nozzles 116 are controlled such that they will not dispense fluid concurrently and/or coincidentally. As such, fluid can be dispensed completely and uniformly without too much fluid covering any one zone or area of the work-piece. It will, therefore, be appreciated that these patterns are configured to precisely control thickness and prevent running of the dispensed fluid.

Figure 5:
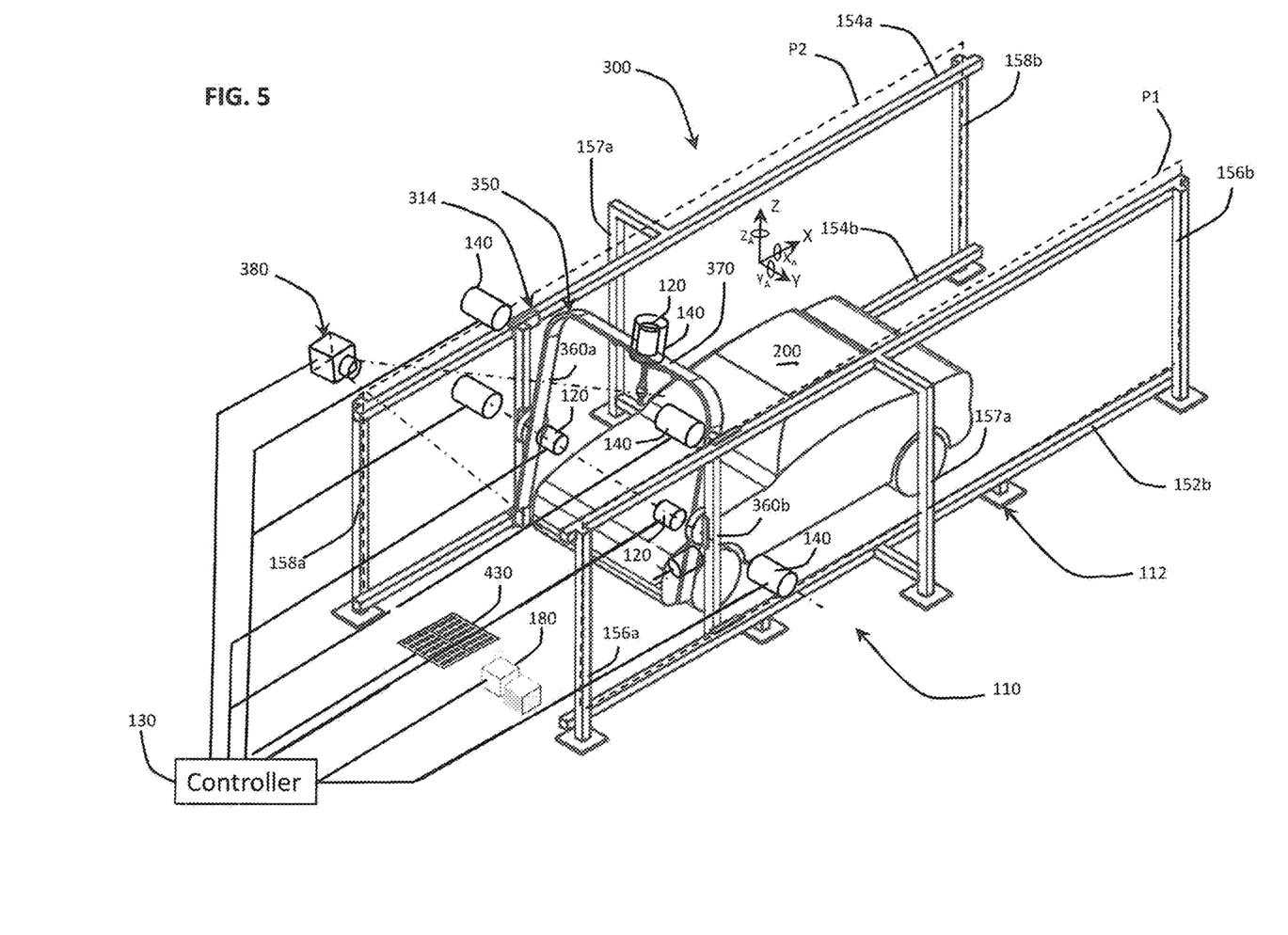
FIG. 5 is a perspective view of a second embodiment of the robotic fluid dispensing system including a movable carriage assembly having a single spray nozzle for dispensing the fluid onto the work-piece.
Figure 8:
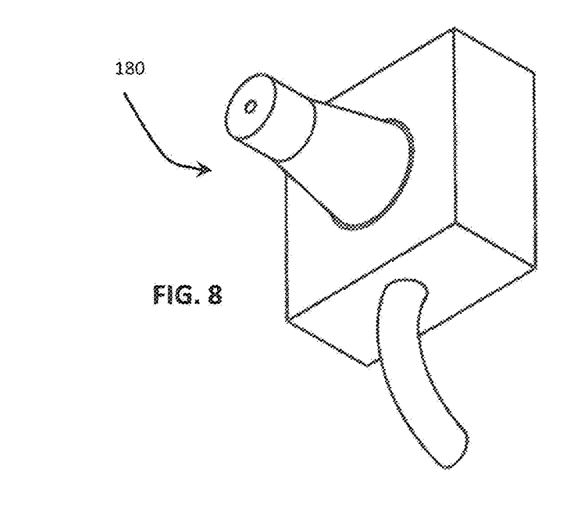
FIG. 8 is a perspective view of a wiper station or cleaning head operative to remove excess paint or sprayed fluid.

In another embodiment of the disclosure depicted in FIGS. 5 and 8, the robotic system 100 may include wiper stations 180 mounted to the stationary support frame structure 110 for cleaning each of the spray nozzles 116 of excess or residual fluid. That is, to ensure proper atomization of the fluid, it will be periodically necessary to clean the nozzle of residue. In the described embodiment. A wiper station 180 is placed or positioned along the path of each spray nozzle 116 such that the nozzle may be cleaned upon engaging the wiper station 180. In the described embodiment, the controller 130 may pulse the spray nozzle 116, i.e., induce a pulse of pressurized air, to force excess fluid out of the nozzle 116 and into the wiper station 180. Additionally, the stationary support frame 112 or the movable carriage assembly 114 may each include heat lamps (not shown) to facilitate curing of an adhesive paint. Of course, the wattage or power requirements of a heat lamp will be dependent upon the specifications of the adhesive paint being dispensed.

Figure 6:
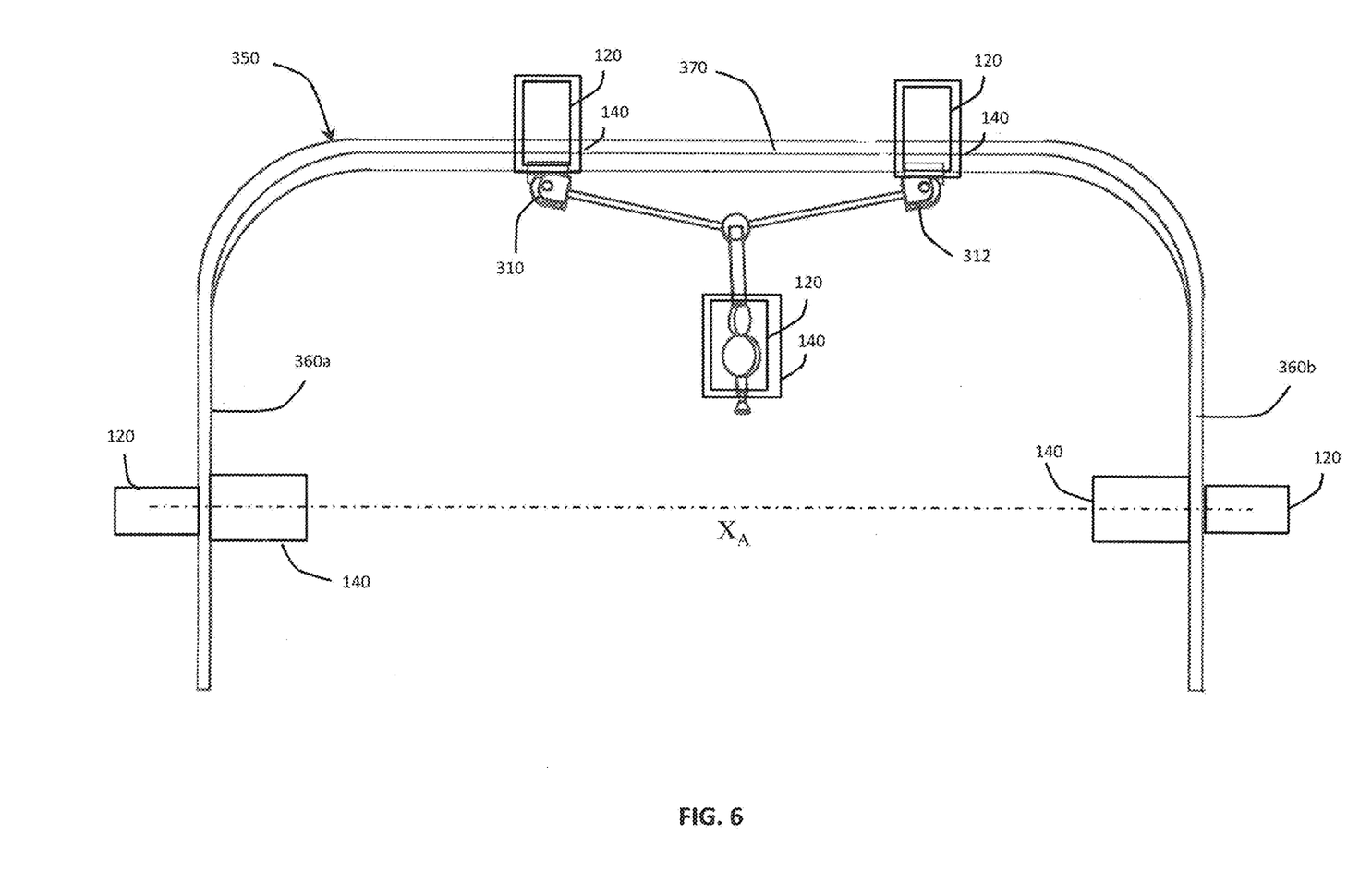
FIG. 6 is an enlarged isolated profile view of an inverted U-shaped frame member employed in combination with the movable carriage assembly.

Another embodiment of a robotic fluid dispensing system 300 is depicted in FIGS. 5 and 6, wherein the same or similar components to those described in connection with FIG. 1, are identified with the same reference numerals. In this embodiment, a single articulating spray nozzle 116 mounts to a carriage assembly 114 having an inverted U-shaped frame member 350 pivotally mounting to the pair of vertical tracks 160a, 160b about a horizontal pitch axis XA. Therein, the articulating spray nozzle 116 includes rolling elements 310, 312 (FIG. 6) which mount within and engage a continuous track which traverses the two corner elbows of the inverted U-shaped frame member 350. More specifically, a pivoting V-shaped mount 360 is configured to engage the rolling elements 310, 312 to mount the spray nozzle 116 to the inverted U-shaped frame member 350. As such, the pneumatically driven motors 140 may drive the spray nozzle 116 (i) across the base or cross-member portion 370 of the inverted U-shaped frame member 350, (ii) around each elbow, and (iii) up or down each of the parallel legs 360a, 360b of the inverted U-shaped frame member 350. It will also be appreciated that the combined vertical and pivot motion of the inverted U-shaped frame member 350, i.e., about the horizontal pitch axis XA, allows the spray nozzle 116 to cover the top, left and right sides of the work-piece or vehicle.

Figure 9:
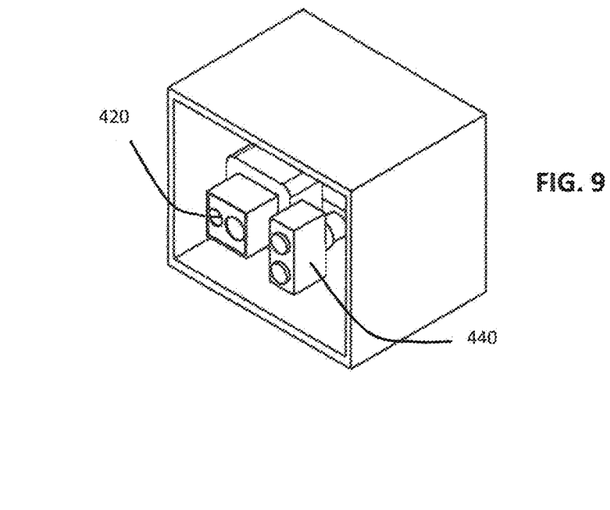
FIG. 9 is a perspective view of a mapping/teaching assembly comprising machine vision optics and a displacement sensor disposed within a protective casing.

In yet another embodiment depicted in FIGS. 5 and 9, a machine vision system 380 may be employed to map the region or paintable area of the work-piece prior to fluid spraying operations. This may include the entire work-piece, a door panel, a bumper, or some portion thereof. The machine vision system 380 is operably coupled to the controller 130 to define and record a scan of the work-piece 200. Full spectrum sensors 500 may be used to prevent deposition of fluid in unintended areas, i.e., masked and unmasked regions defining those areas which may be subject to being sprayed with the fluid. The scanned work-piece 200 in combination with displacement sensors (not shown) may be employed for maintaining the requisite distance between the work-piece 200 and the respective spray nozzle 120 and/or a curing unit light or source of heat (not shown).

Figure 7:
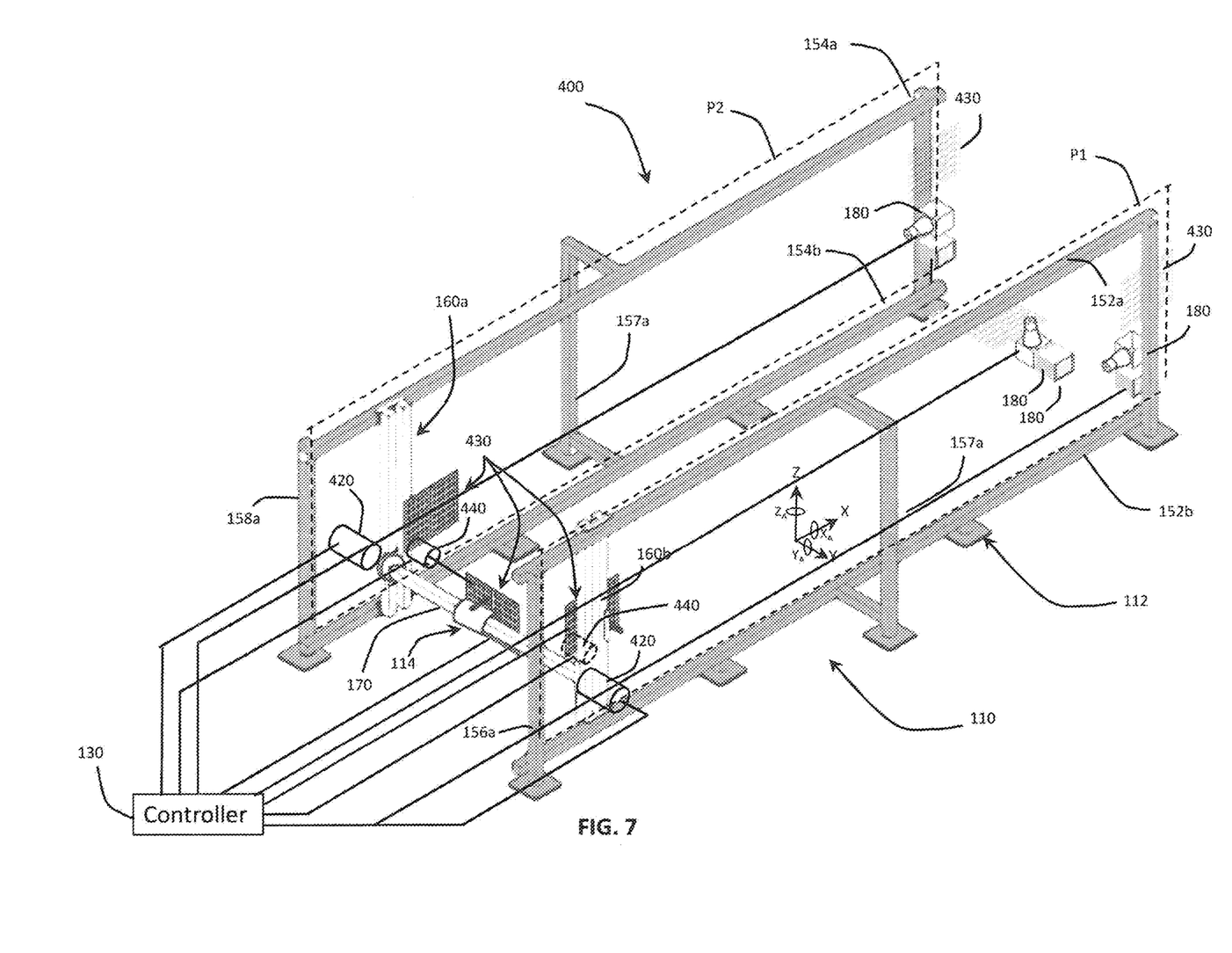
FIG. 7 is a perspective view of a third embodiment of the robotic fluid dispensing system including a movable carriage assembly having: (i) a UV, or other, heat source for curing an adhesive paint dispensed by the at least one spray nozzle, (ii) a plurality of full spectrum sensors operative to stop and start the flow of fluid dispensed by the spray nozzle depending upon the color or wavelength or light detected by the sensor, and (iii) a plurality of displacement sensors to control the rate of displacement of the pneumatically controlled motors.
Figure 10:
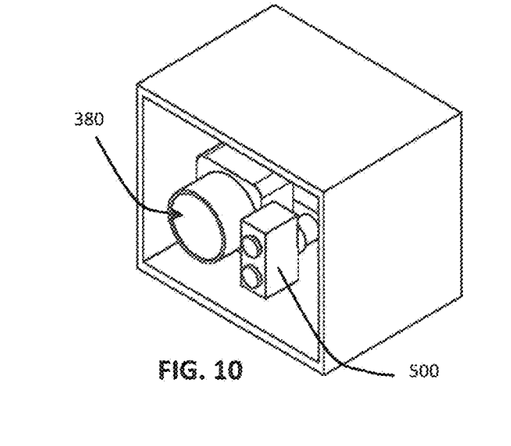
FIG. 10 is a perspective view of a mapping/teaching assembly comprising a full spectrum sensor and displacement sensor disposed within a protective casing.
Figure 11:
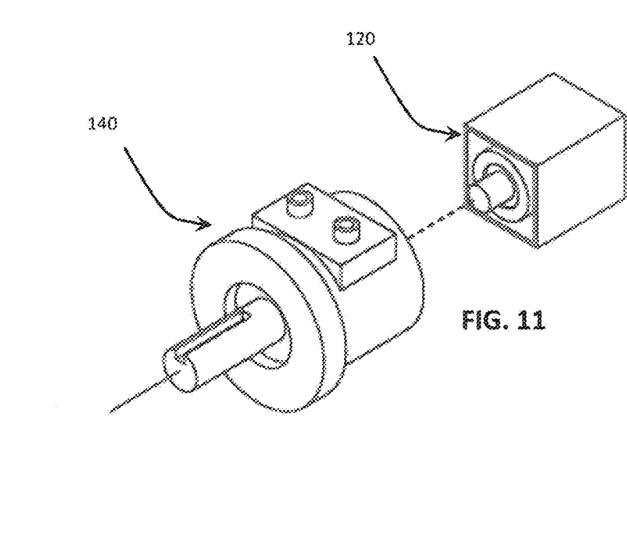
FIG. 11 is a perspective view of an absolute position sensor disposed within a protective casing and disposed along the drive axis of a pneumatically driven motor.

Yet another embodiment of a robotic fluid dispensing system 400 shown in FIGS. 7, 10 and 11 includes: (i) a plurality of displacement sensors 420 to monitor the rate of displacement, or velocity, of the moveable carriage assembly 114, (ii) a plurality of UV or radiant heat sources 430 operative to cure the adhesive or curable coating dispensed on the work-piece, and (iii) a plurality of full spectrum sensors 440 operative to start and stop the flow of fluid depending upon the wavelength of light energy sensed by the full spectrum sensors 440. It will be appreciated that displacement, temperature and wavelength signals will be issued by each of the displacement, temperature and full spectrum sensors, 420, 430, 440, respectively, and received by the controller 130 to determine the velocity, energy requirements and start/stop sequence of the fluid dispensed by the spray nozzles 116.

With respect to item (i) above, it will be appreciated that the rate of displacement of each spray nozzle 120 determines the thickness of coating or layer dispensed by the spray nozzle 120. As such, displacement sensors 420 may be employed to accurately determine thickness of fluid being dispensed onto the surface of the work-piece 200. Alternately, a displacement signal may be derived from the position signals issued by the position sensors 120.

With respect to item (ii) above, a plurality of UV or radiant heat sources 430 may be disposed in combination with each spray nozzle 116 (see FIG. 1) to rapidly cure the adhesive coating or paint dispensed on the work-piece 200. In the described embodiment, each of the vertical track members 160a, 160b and cross-member 170 may include an array of curing heat lamps or light emitting diodes 430 to curing the adhesive immediately following the dispensation of fluid.

With respect to item (iii) above, a plurality of full spectrum sensors 440 are operative to start and stop the flow of fluid depending upon the wavelength of light energy sensed by the respective full spectrum sensor 440. For example, an area of the work-piece may be masked by tape of a particular color, e.g., red taped, such that upon sensing a wavelength of greater than about 660 nanometers, the controller may be programmed to "stop" dispensing fluid until such time that the wavelength change to another color indicative of a "start" dispensing signal. In this embodiment, an alternative placement of each wiper station 180 is shown. That is, rather than being located toward or at an end of the support structure, the wiper stations 180 may be located at the front portion of the cuboid-shaped support structure 110.

In summary, the robotic systems 100, 300 of the present disclosure each comprise support structures 110 producing a cuboid-shaped frame having a stationary frame structure 112 for mounting a movable carriage assembly 114, 314 wherein the controller 130 is disposed outside the confines of the cuboid shaped frame and wherein the location of the controller 130 and the at least one pneumatically driven motor 140 prohibits a source of ignition for volatiles out-gassed from the sprayed fluid by one spray nozzle 120.

Various systems may be combined or excluded to enhance or simplify the capabilities of the robotic fluid dispensing system. For example, FIG. 7 depicts an alternate embodiment wherein the wiper cleaning station 180 is disposed at the entrance of the cuboid shaped support structure 110. the spray nozzles 116 may be equipped with fixed or articulating mounts. The wiper station 180 for cleaning the spray nozzles 116 may be located at the front or aft end of the cuboid shaped support structure 110. Motion sensors, displacement/position sensors and full spectrum optical sensors may be employed to enhance the accuracy of the fluid being dispensed. A curing assembly may be used to augment or accelerate the rate that the fluid dries. The number of spray nozzles 116 may vary from at least one nozzle 116 to three or more nozzles 116 depending upon the articulation and movement of the carriage assembly 114. The surface of the work piece 200 may be scanned and mapped to determine the distance that a spray nozzle 116 must maintain for accurate and/or uniform spray thickness and quality. The curing system may employ an array of UV lights or a conventional radiant heat lamp.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A robotic system for applying a fluid to a work-piece, comprising:
   a support structure configured to mount at least one nozzle for spraying the fluid on a surface of the work-piece, the support structure facilitating displacement of the at least one nozzle in multiple degrees of freedom;
   at least one position sensor configured to sense a position of the at least one spray nozzle and providing a position signal indicative thereof;
   at least one pneumatic drive device to effect displacement of the at least one spray nozzle on the support structure along each degree of freedom provided by the support structure;
   a controller, responsive to the position signal, for controlling the least one pneumatic drive device to displace the at least one spray nozzle and dispense the fluid on the work-piece; and
   a horizontal cross member forming a base of an inverted U-shaped frame structure having a pair of parallel leg members, the parallel leg members pivotally mounting to vertical members of a movable carriage assembly about a horizontal axis,
   a pivoting V-shaped mount for mounting the at least one spray nozzle to the horizontal cross member, each end of the V-shaped mount defining a rolling element for engaging a track in the inverted U-shaped frame structure such that the at least one spray nozzle may be displaced in a horizontal direction along the cross member and in a vertical direction along each leg member of the inverted U-shaped frame structure; and
   wherein the support structure produces a cuboid-shaped frame having a stationary frame structure for mounting the movable carriage assembly, wherein the controller is disposed outside the confines of the cuboid-shaped frame and wherein the location of the controller and the at least one pneumatic drive device prohibits a source of ignition for volatiles out-gassed from the sprayed fluid, and
   wherein the at least one spray nozzle mounted to the cross member is configured for side-to-side displacement in a horizontal direction orthogonal to pairs of horizontal members associated with the stationary frame structure.

2. The robotic system according to claim 1, wherein the support structure is configured to mount the at least one spray nozzle along three dimensional planes and along at least one axis of rotation.

3. The robotic system according to claim 1, wherein the support structure is configured to mount the at least one spray nozzle along three dimensional planes and along at least two axes of rotation.

4. The robotic system according to claim 2, wherein the support structure is configured to mount three spray nozzles, each spray nozzle disposed along the three dimensional planes.

5. The robotic system according to claim 1 wherein the cross member of the carriage assembly defines an axis, and wherein the cross member is configured to rotate about the axis to facilitate rotary displacement of the at least one spray nozzle mounted to the cross member.

6. The robotic system according to claim 1, further comprising a wiper station disposed along a path of the at least one spray nozzle and configured to clean fluid residue on the at least one spray nozzle upon engaging the wiper station.

7. The robotic system according to claim 1, wherein the at least one pneumatic drive device further comprise position encoders for issuing supplemental position signals, and wherein the controller is responsive to the supplemental position signals for precise placement of the movable carriage assembly and each of the at least one spray nozzles.

8. The robotic system according to claim 1, further comprising a displacement sensor configured to issue a rate signal indicative of the rate of displacement of the at least one spray nozzle and wherein the controller is responsive to the rate signal to control the at least one pneumatic drive device.

9. The robotic system according to claim 1, further comprising a heat source disposed in combination with each member of the movable carriage assembly to cure the fluid dispensed onto the surface of the work-piece.

10. The robotic system according to claim 1, further comprising a full spectrum sensor configured to sense a wavelength of light energy and issue a wavelength signal indicative thereof, and wherein the controller is responsive to the wavelength signal to control one of, when the at least one spray nozzle initiates the dispensing of fluid and when the at least one spray nozzle terminates the dispensing of fluid.

11. A robotic system for applying a fluid on a work-piece, comprising:
a support structure defining a cuboid-shaped frame having a stationary frame structure defining pairs of horizontal tracks, and a movable carriage assembly having a pair of vertical members and at least one horizontal cross member disposed across and mounting to each of the vertical members, wherein each vertical member is configured to move along each pair of horizontal tracks and the at least one cross member is configured to move vertically with respect to the vertical members,
a spray nozzle having an articulated mount for being mounted to, and moving along, the carriage assembly, the articulated mount facilitating motion of the spray nozzle in multiple degrees of freedom;
a plurality of position sensors configured to sense a position of the spray nozzle and the carriage assembly, each position sensor providing a position signal indicative thereof;
a plurality of pneumatic drive devices configured to effect displacement of the carriage assembly relative to the stationary frame structure and the spray nozzle;
a controller, responsive to the position signals, for controlling the pneumatic drive devices to displace the spray nozzle and dispense the fluid on the work-piece;
wherein the at least one cross member forms a base of an inverted U-shaped frame structure having a pair of parallel leg members, the parallel leg members pivotally mounting to the vertical members of the movable carriage assembly about a horizontal axis, and
a pivoting V-shaped mount for mounting the spray nozzle to the at least one horizontal cross member, each end of the V-shaped mount defining a rolling element for engaging a track in the inverted U-shaped frame structure such that the spray nozzle may be displaced in a horizontal direction along the at least one cross member and in a vertical direction along each leg member of the inverted U-shaped frame structure.

12. The robotic system according to claim 11, wherein the pneumatic drive devices and a spatial position of the controller prohibits a source of ignition for the volatiles outgassed from the fluid sprayed by the nozzle.

13. The robotic system according to claim 11, wherein the articulated mount and movable carriage assembly are configured to facilitate motion of the spray nozzle along three dimensional planes and along at least one axis of rotation.

14. The robotic system according to claim 11, wherein the articulated mount and movable carriage assembly are configured to facilitate motion of the spray nozzle along three dimensional planes and along at least two axes of rotation.

15. The robotic system according to claim 11 wherein the at least one cross member of the carriage assembly defines an axis, and wherein the at least one cross member is configured to rotate about the axis to facilitate one hundred and eighty degrees of rotary displacement of the at least one cross member.

16. The robotic system according to claim 11, wherein the spray nozzle mounted to the at least one horizontal cross member is configured for side-to-side displacement in a horizontal direction orthogonal to pairs of horizontal members associated with the stationary frame structure.

17. The robotic system according to claim 11, wherein the stationary frame structure comprises vertical frame members disposed at each corner of the cuboid shaped frame, and an intermediate vertical frame member disposed between each corner of the cuboid shaped frame, each intermediate vertical frame member being displaced outboard of a plane defined by two vertical frame members at each corner of the stationary frame structure wherein the outboard position of each intermediate vertical frame member provides frame stability.

18. The robotic system according to claim 11, further comprising a displacement sensor configured to issue a rate signal indicative of the rate of displacement of the spray nozzle and wherein the controller is responsive to the rate signal to control each pneumatic drive device.

19. The robotic system according to claim 11, further comprising a heat source disposed in combination with the movable carriage assembly to cure the fluid dispensed onto the surface of the work-piece.

20. The robotic system according to claim 11, further comprising a full spectrum sensor configured to sense a wavelength of light energy and issue a wavelength signal indicative thereof, and wherein the controller is responsive to the wavelength signal to control one of, when the spray nozzle initiates the dispensing of fluid and when the spray nozzle terminates the dispensing of fluid.

21. The robotic system according to claim 11, further comprising:
at least one curing unit comprising a source of UV light for curing the sprayed fluid; and
at least one mapping unit configured to determine: (i) a path of travel for the spray nozzle, (ii) an applied area of the work-piece, and (iii) a distance from the spray nozzle to the work-piece.

22. The robotic system according to claim 11, further comprising:
at least one curing unit comprising a heat source for curing the sprayed fluid; and
at least one mapping unit configured to determine: (i) a path of travel for the spray nozzle, (ii) an applied area of the work-piece, and (iii) a distance from the spray nozzle to the at least one curing unit.

23. A robotic system for curing a fluid sprayed onto a work-piece, comprising:
- a support structure configured to mount at least one spray nozzle for spraying the fluid on a surface of the work-piece, the support structure facilitating displacement of the at least one spray nozzle in multiple degrees of freedom;
- at least one pneumatic drive device to effect displacement of the at least one spray nozzle on the support structure along each degree of freedom provided by the support structure;
- a source of heat disposed in combination with the support structure and configured to cure the fluid sprayed on the work-piece;
- at least one position sensor configured to sense a position of the at least one spray nozzle and providing a position signal indicative thereof;
- at least one mapping unit configured to teach a travel path, an applied area and a distance of the work-piece relative to one of the at least one spray nozzle and the source of heat;
- a controller, responsive to the position signal, for controlling the least one pneumatic drive device to displace the at least one spray nozzle and dispense the fluid on the work-piece, the controller controlling the source of heat to cure the fluid sprayed on the work-piece;
- wherein at least one horizontal cross member forms a base of an inverted U-shaped frame structure having a pair of parallel leg members, the parallel leg members pivotally mounting to vertical members of a movable carriage about a horizontal axis; and
- a pivoting V-shaped mount for mounting the at least one spray nozzle to the at least one horizontal cross member, each end of the V-shaped mount defining a rolling element for engaging a track in the inverted U-shaped frame structure such that the at least one spray nozzle may be displaced in a horizontal direction along the at least one cross member and in a vertical direction along each leg member of the inverted U-shaped frame structure.

24. The robotic system according to claim 23, wherein the source of heat produces UV light.

25. The robotic system according to claim 23, wherein the source of heat produces a source of radiant heat.

* * * * *